United States Patent [19]

Bösch et al.

[11] Patent Number: 5,556,176

[45] Date of Patent: Sep. 17, 1996

[54] METHOD FOR CONTROLLING VEHICLE BRAKE PRESSURE AS A FUNCTION OF THE DEVIATION OF THE ACTUAL SLIP OF WHEELS RELATIVE TO A DESIRED SLIP

[75] Inventors: Peter Bösch, Esslingen; Karl-Eugen Laubacher, Köngen; Dieter Ammon, Stuttgart; Manfred Steiner, Winnenden, all of Germany

[73] Assignee: Mercedes-Benz AG, Germany

[21] Appl. No.: 452,532

[22] Filed: May 30, 1995

[30] Foreign Application Priority Data

May 28, 1994 [DE] Germany ............... 44 18 772.6

[51] Int. Cl.$^6$ ............................................. B60T 8/32
[52] U.S. Cl. ................... 303/165; 303/163; 303/147
[58] Field of Search ........................... 303/163, 165, 303/164, 174, 189, 140, 139, 143, 146, 147, 153, 167, 150; 180/197; 364/426.01, 426.02, 426.03; 188/181 A, 181 C, 181 R

[56] References Cited

U.S. PATENT DOCUMENTS 4,715,662 12/1987 Van Zanten et al. ............... 303/150
5,140,524 8/1992 Matsuda .............................. 303/146

FOREIGN PATENT DOCUMENTS

| 0440132 | 8/1991 | European Pat. Off. . |
| 4030724A1 | 4/1992 | Germany . |
| 4030704A1 | 4/1992 | Germany . |
| 2248479 | 4/1992 | United Kingdom . |
| 92/05984 | 4/1992 | WIPO . |
| 92/05986 | 4/1992 | WIPO . |

*Primary Examiner*—Douglas C. Butler
*Attorney, Agent, or Firm*—Evenson, McKeown, Edwards & Lenahan P.L.L.C.

[57] ABSTRACT

The invention relates to a method for controlling vehicle brake pressure as a function of the deviation of the actual slip of wheels relative to a prescribed desired slip. The desired slip is determined from the wheel speeds in such a way that the cornering forces occurring between wheel and roadway given the specific desired slip values and the adhesion conditions occurring, ensure stable handling.

14 Claims, 4 Drawing Sheets

METHOD FOR CONTROLLING VEHICLE BRAKE PRESSURE AS A FUNCTION OF THE DEVIATION OF THE ACTUAL SLIP OF WHEELS RELATIVE TO A DESIRED SLIP

BACKGROUND AND SUMMARY OF THE INVENTION

The present invention relates to a method for controlling the brake pressure of a vehicle as a function of the deviation of the vehicle wheels relative to a prescribed desired slip.

German patent document DE 40 30 724 A1, discloses a system of this type, in which the desired slip is determined not only as a function of the vehicle speed but also as a function of the cornering forces. In this case, the specified slip is determined from longitudinal forces and lateral forces on the wheel which have been determined. In addition to the wheel speeds, the yaw velocity and the steering angle are required for this purpose as additional measured variables. The yaw behavior of the vehicle is then controlled on the basis of the desired yaw rate, derived from the measured steering angle, and the actually measured yaw velocity. A specified brake pressure is then determined for each wheel from the system deviation between the desired slip and the actual slip; and the brake pressure is controlled.

A method is disclosed in German patent document DE 40 30 704 A1 by means of which a desired slip value is determined from the measured variables of steering angle, yaw velocity, wheel speeds and brake pressure by using a vehicle model. In this case, the calculation of the desired slip by means of a vehicle model and an assigned controller is computationally intensive and likewise requires a high outlay on sensors.

In both of these methods, it is necessary to know the yaw behavior or the slip angle of the wheels from the specification of a path curve for the vehicle, which in turn is determined from the steering angle and yaw rate. The cornering forces are determined in this case from the vehicle model, and not from the relationships between the wheel and road. The yaw behavior is controlled on the basis of a driving condition which has arisen whenever the yaw velocity deviates beyond a measure of tolerance from the desired yaw rate derived from the steering angle. The specified desired slip for wheel brakes is influenced in accordance with a stabilization of the vehicle in order to control the yaw behavior of the vehicle, and thus to stabilize the driving condition.

In contrast, in the case of the conventional antilock braking system, the brake pressure is controlled so that, for example, the maximum braking force between the wheel and road is determined by the specification of the desired slip. In this case, the desired slip is specified via an evaluation of the wheel speeds. Such methods do not, however, take account of the lateral forces on the wheel. A stable driving condition is not guaranteed in the case of cornering, since it is not always possible at maximum braking force to apply an adequate lateral force to the tire. Depending on the conditions of the vehicle, this can lead to understeering or oversteering.

The object of the present invention is to configure a brake pressure control by means of specified desired slip so as to guarantee stable or neutral handling. Unlike conventional antilock systems, this is to be performed without additional sensors and without a high computational outlay.

This object is achieved by the brake pressure control process according to the invention, in which the desired slip is determined from the wheel speeds such that the cornering forces occurring between wheel and roadway and the adhesion conditions occurring, ensure stable handling. In one embodiment of the invention, the desired slip is maximized within the range limits afforded by the requirements placed on the cornering forces.

Other objects, advantages and novel features of the present invention will become apparent from the following detailed description of the invention when considered in conjunction with the accompanying drawings.

DETAILED DESCRIPTION OF THE DRAWINGS

Figure 1:
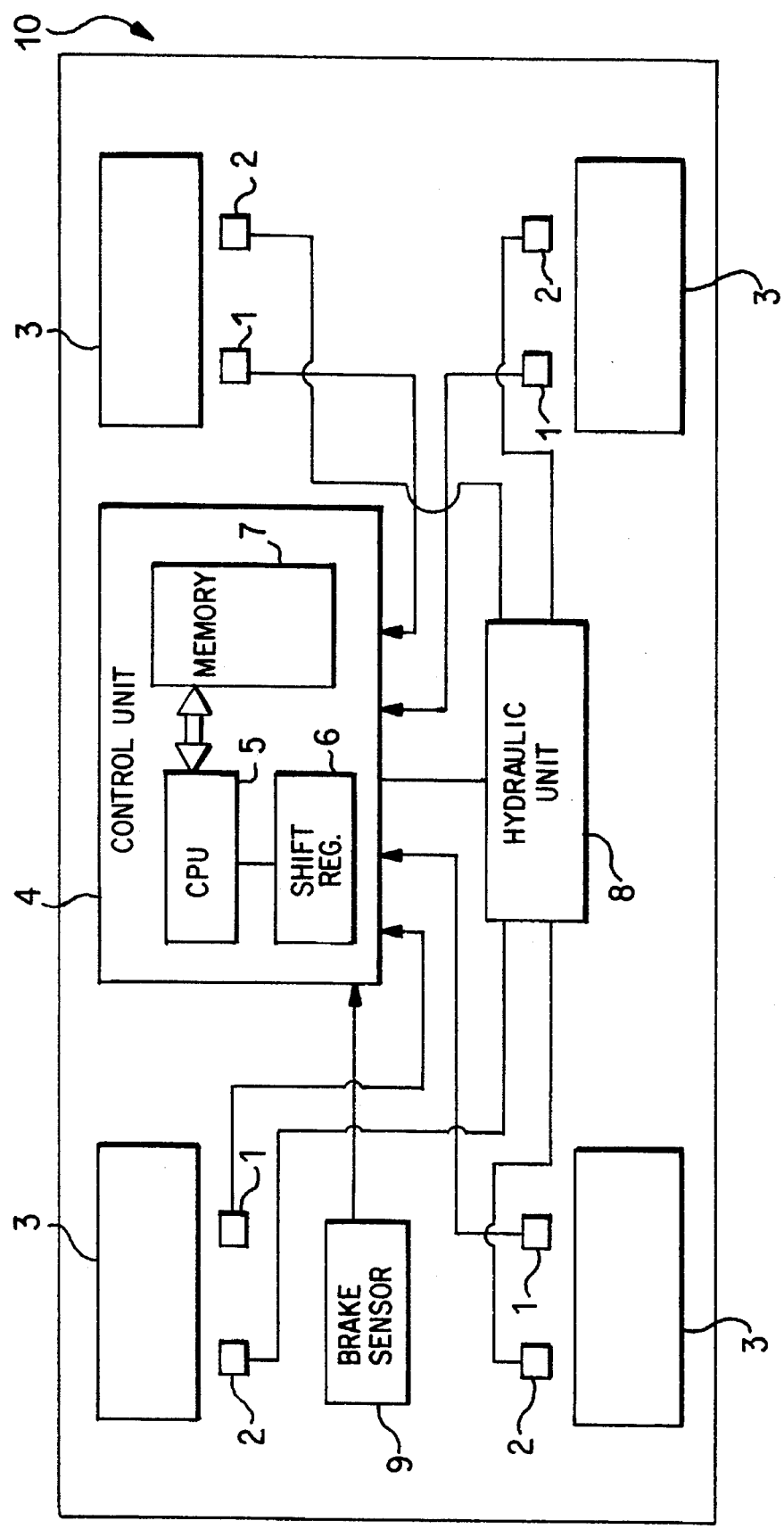
FIG. 1 shows a conceptual block diagram of a braking control arrangement for performing the process according to the invention.

FIG. 1 is a conceptual block diagram of a control arrangement for performing the brake pressure control process according to the invention. As shown in FIG. 1, an automobile 10 has four wheels 3, each of which has a wheel speed sensor 1. Output signals from the wheel speed sensors 1 are provided to a control unit 4, which comprises a central processing unit (CPU) 5, a memory 7 and a shift register 6. Based on these input signals, and on a signal from a brake pedal sensor 9, the control unit calculates a control signal which is provided to a hydraulic unit 8, which in turn controls the hydraulic pressure provided to wheel cylinders 2 that apply braking force to each of the wheels 3.

Figure 2:
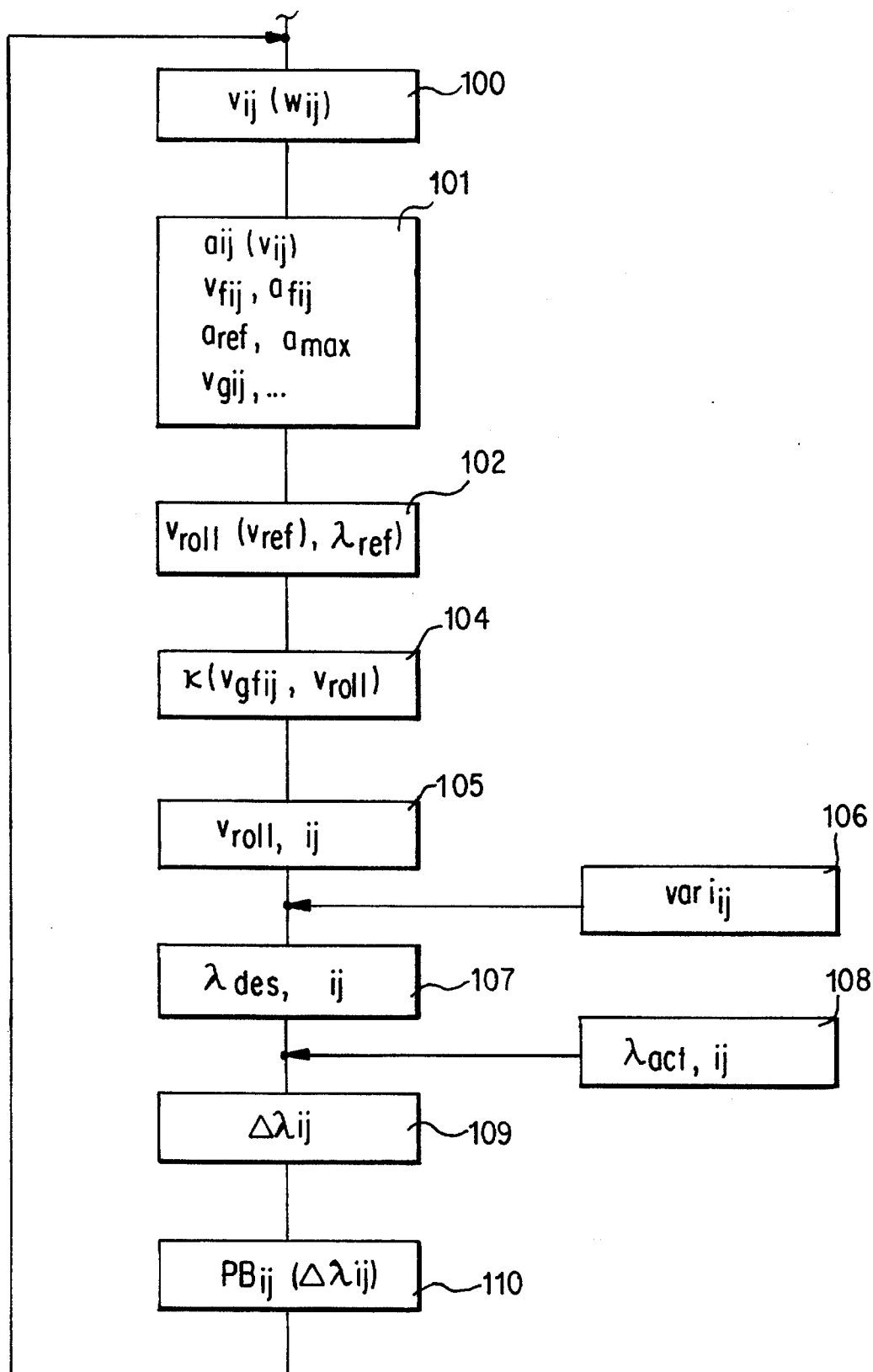
FIG. 2 shows a flow diagram for a brake pressure control according to the invention.

FIG. 2 shows a flow diagram for a brake pressure control process for a two-axle passenger car with a driven rear axle, in which the brake pressure is determined from the deviation between a determined desired slip and a given actual slip. The brake pressure control process of FIG. 1 is performed cyclically, the sequence for one cycle being described.

The equations and designations are based on the following conventions for indices;

| | |
|---|---|
| v front axle | h rear axle |
| l left-hand wheel | r right-hand wheel |
| i front axle or rear axle | |
| j left-hand or right-hand wheel | |
| f filtered variable | g gradient-limited variable |

A speed sensor 1 is arranged on each wheel 3 of the vehicle. The speeds $\omega_{ij}$, measured independently of the occurrence of a braking operation, are converted in step 100 into wheel speeds $v_{ij}$ and checked for plausibility. Outliers are filtered out. A "zero logic" detects the standstill of a wheel when a specific number of consecutive measurements of the wheel speed $\omega_{ij}$ remains identical. If this holds for all four wheels simultaneously, the standstill of the vehicle is established. In the presence of a traction control system, the wheel speeds $v_{hj}$ of the rear axle are limited to a specific value, for example 0.5 m/s, above the maximum $\max(f_{vj})$ of wheel speeds of the front axle, as long as the brake is not actuated. The brake actuation can be detected, for example, via the switch position of the brake light switch 9.

Auxiliary variables which are accessed in later calculations at a different point and at different instants are derived in step 101 from the wheel speeds $v_{ij}$. That is the wheel speeds $v_{ij}$ are differentiated, giving the wheel acceleration $a_{ij}$. Filtered wheels speeds $v_{fij}$ and filtered wheel acceleration $a_{fij}$ are determined by means of filters, for example, by a Bessel filter with frequencies of 5 Hz and 1 Hz, respectively. A reference deceleration $a_{ref}$ is formed in accordance with $$a_{ref} = \max (a_{fij} < 0).$$

That is, $a_{ref}$ is determined as the maximum of the values $a_{fij}$ which have a negative sign (connoting a deceleration).

The reference deceleration $a_{ref}$ is stored in a shift register 6 (FIG. 1) during brake actuations. The mean reference deceleration $a_{refm}$ is the mean of the reference deceleration values $a_{ref}$ stored in the shift register 6. A limited maximum acceleration $a_{max}$ is determined therefrom in accordance with $$a_{max} = \max (k1 * a_{refm}; -15 \text{ m/s}^2),$$

k1 being a prescribed numerical constant value which has a value of between 1.0 and 3.0, and preferably is approximately 2.5.

A gradient-limited wheel speed $v_{gij}$ is determined therefrom for each filtered wheel speed:

$$v_{gij} = \max [(v_{gij,old} + a_{max} * t_{zyk}), v_{fij}],$$

$v_{gij,old}$ being the gradient-limited wheel speed determined in the preceding cycle, and $t_{zyk}$ being the period of a single iteration of the process according to the invention. The mean longitudinal deceleration $a_{fm}$, it should be noted, is formed from the arithmetic mean value of the filtered wheel decelerations $a_{fij}$. A filtered mean longitudinal deceleration $a_{fmx}$ is derived from the mean longitudinal deceleration $a_{fm}$. Filtering can be performed, for example, using filters of the 1st order and low filter frequencies (below 1 Hz).

A slip-affected reference speed $v_{ref}$ is determined in step 102 in accordance with $$v_{ref} = \max (v_{gij}; 0)$$

when the vehicle is braked, and otherwise in accordance with $$v_{ref} = \max (v_{gvj}; 0).$$

The rolling speed $v_{roll}$ of the vehicle is derived from this slip-affected reference speed $v_{ref}$ by estimating the slip $\lambda_{ref}$ in accordance with the relationship $$\lambda_{ref} = k_{roll} * a_{refm},$$

$k_{roll}$ being a fixed numerical value—for example—0.005.

The roll speed $v_{roll}$ is then yielded in accordance with $$v_{roll} = v_{ref}(1 + \lambda_{ref}),$$

the slip being determined at the wheels and the brake pressure being controlled on the basis of this rolling speed $v_{roll}$.

If the vehicle is on a curve, the wheels move on different curve radii, and obey the Ackermann condition if they roll in a force-free fashion. According to this condition, precisely defined speed relationships between the individual vehicle wheels are yielded from the turning curvature $\kappa$ and the geometrical relationships at the vehicle. A conclusion is drawn concerning the turning curvature $\kappa$ in step 104 from wheel speeds. The turning curvature $\kappa_{roll}$ is determined from $$\kappa_h = \frac{v_{gfhl} - v_{gfhr}}{v_h \cdot s_h}, \quad \kappa_4 = \frac{\Delta v}{v_{roll} \cdot s_h} \text{ and}$$

$$\kappa_{roll} = \kappa_h \frac{v_h}{v_v} \left( 1 + \frac{a_{y,4}}{10} \right)$$

from the measured, gradient-limited and subsequently refiltered wheel speeds $v_{gfij}$, $s_i$ representing the track width of the front axle or rear axle. (The subscript 4 in the above equation, and hereinafter, connotes a value which is calculated based on all 4 wheels of the vehicle.) Use is made in this case of the differential speed $\Delta v$ as between the two wheels. The wheels can be selected via a family of characteristics, it being possible for the difference $\Delta v_{ij}$ between the filtered and gradient-limited wheel speed $$\Delta v_{ij} = v_{fij} - v_{gij}$$

for example, to be used as the selection criterion. The lateral acceleration $a_y$ of the vehicle can be determined from the equation $$a_{y,4} = v_{roll}^2 \cdot \kappa_4 = v_{roll}^2 \frac{\Delta v}{v_{roll} \cdot s_h}.$$

For reasons of plausibility, the turning curvature $\kappa$ is limited by a maximum lateral acceleration $a_{aymax}$, and so it holds that $$\kappa = \text{sign}(\kappa) \min \left( |\kappa|, \frac{a_{y,max}}{v_{roll}^2} \right).$$

The turning curvature $\kappa$ can be set to zero above a vehicle speed of approximately 100 km/h, since the errors then occurring in the slip calculation are at most 1.8%.

A proportionally factor $F_{ij}$ which, when multiplied by the rolling speed $v_{roll}$, yields the rolling speed $v_{roll,ij}$ of each wheel can be determined for each wheel from the turning curvature $\kappa$ thus determined. If it holds that $$\max_{fv} = \max \left[ \left( 1 + \kappa \frac{s_v}{2} \right), \left( 1 - \kappa \frac{s_v}{2} \right) \right]$$

then the proportionality factors $F_{ij}$ are calculated in accordance with $$F_{vl} = \left( 1 + \kappa \frac{s_v}{2} \right) \frac{1}{\max_{fv}}$$

$$F_{vr} = \left( 1 - \kappa \frac{s_h}{2} \right) \frac{1}{\max_{fv}}$$

$$F_{hl} = \left( \cos\delta + \kappa \frac{s_h}{2} \right) \frac{1}{\max_{fv}}$$

$$F_{hr} = \left( \cos\delta + \kappa \frac{s_h}{2} \right) \frac{1}{\max_{fv}}$$

it being possible to determine the steering angle $\delta$ from $$\cos\delta = \min \left( \frac{v_h}{v_v}, 1 \right).$$

The proportionality factors thus calculated can then further be narrowed down to a range of values, for example, between [0.7;1] for the front axle and to values between [0.5;1] for the rear axle, in order to compensate for outliers, errors and large deviations. The values of the rolling speed $v_{roll,ij}$ of the wheels are calculated in step 105 and then, for example, made available for determining slip.

On the basis of the determined turning curvature κ, the calculated auxiliary variables and the preceding system deviations $vari_{ij}$ calculated in a manner described below, which are stored in a shift register (step 106) having n memory locations for each wheel, a desired slip $\lambda_{des,ij}$ is now determined in step 107 individually for each wheel (referred to herein as "wheel slip") in accordance with the equation $$\lambda_{des,ij} = \kappa_{\lambda,i} \cdot F_{a_{fmx,i}} \cdot F_{vari_{ij}} \cdot F_\kappa$$

$\kappa_{\lambda,i}$ being a predetermined constant value which is a function of the tire adjustment, and can have, for example, numerical values of 11% slip for the front axle and 8% slip for the rear axle.

In this case, the factor $F_{a_{fmx}}$, which takes account of the maximum coefficient of friction between the wheel 3 and the roadway, is determined, for example, from:

$$F_{a_{fmx}} = 0.1071 \cdot a_{fmx} - 0.1429.$$

The factor is limited to a range, for example of

[−1;−0.25], which is determined from the minimum required slip and maximum permissible slip, and the decelerations of the vehicle which are possible in this case.

The effect of $F_{vari_{ij}}$ (defined below) is to modify the desired slip for each wheel within a specific range (for example by 20%), as a function of the variance of the system derivation $\Delta\lambda_t$. Here, $vari_{ij}$ is the variance of the values, stored in the shift register 6, of preceding system deviations; that is to say $$vari_{ij} = \frac{\sum_{t=T-n-1}^{T-1} |\Delta\lambda_t|}{n}.$$

The factor $F_{vari_{ij}}$ is then yielded from the relationship $$F_{vari,vj} = -10 * vari_{,vj} + 1.3$$

$$F_{vari,hj} = -10 * vari_{,hj} + 1.1$$

and is thereafter limited to the interval $F_{vari_{ij}} = [0.9;1.1]$ with a 10% change. The values are yielded in this case in conjunction with fine tuning of the control quality to the maximum of the slip, and are to be tuned to the controller in detail, for example, by road tests. The specified values are therefore only guide variables and must be adapted individually to different controllers.

The factor $F_\kappa$ takes account of the slip in the event of a lateral acceleration on a turn, and can be used to set the desired cornering ability. The prescribed value $k_\kappa$ determines the maximum value of the factor, which is determined in accordance with the relationship $$F_{\kappa,v} = (|a_{y,4}| - 3) \frac{F_2 - 1}{4} + 1, F_{\kappa,h} = 1,$$

where $$F_1 = (1 - \kappa_\kappa) \cdot \frac{3 + a_{fmx}}{5} + 1, F_1 \in [1;\kappa_\kappa]$$

and $$F_2 = (F_1 - \kappa_\kappa) \cdot v_{roll} + \kappa_\kappa, F_2 \in [F_1;\kappa_\kappa];$$

where $a_{y,4}$ is the lateral acceleration which results from the determined turning curvature and can be calculated by means of $$a_{y,4} = v_{roll}^2 \cdot \kappa_4 = v_{roll}^2 \cdot \frac{\Delta v}{v_{roll} \cdot s_h}.$$

The factor $F_\kappa$ is thus always larger than or equal to 1. The smaller the value, the smaller is the slip difference allowed on the basis of cornering.

Figure 3:
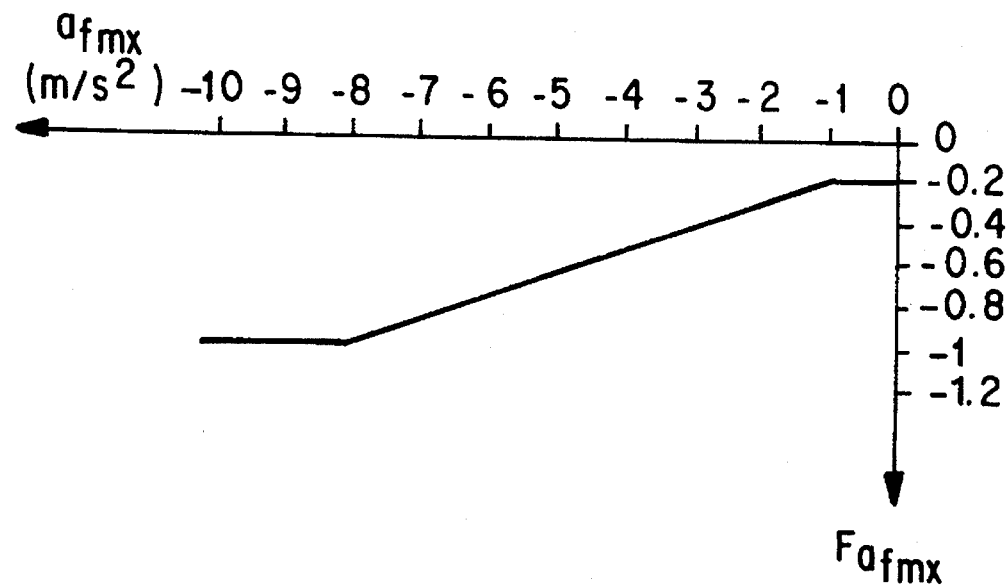
FIGS. 3, 4, 5a, 5b and 5c show characteristics for determining the specified desired slip.
Figure 4:
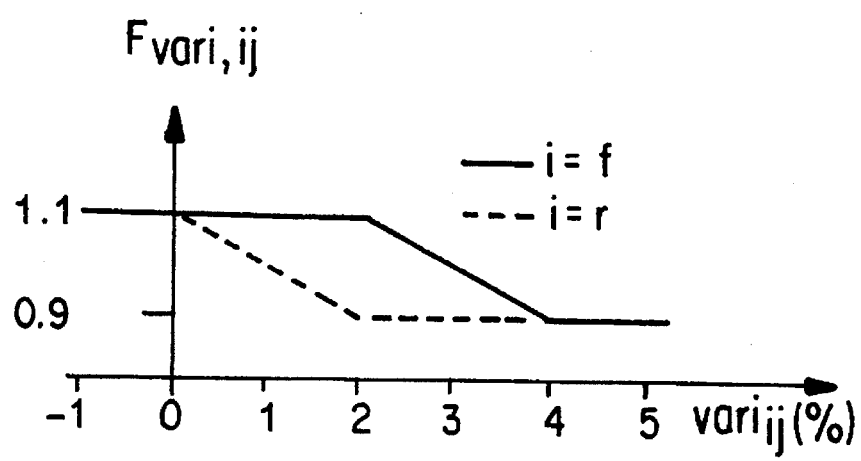

The values of the factors can also be taken from a family of characteristics, such as FIGS. 3 to 5.

The determined desired slip $\lambda_{des,ij}$ and the actual slip $\lambda_{act,ij}$ determined in step 108 are used to determine the system deviation $\Delta\lambda_{ij}$ in step 109, individually for each wheel, by subtracting the actual slip from the desired slip. In step 110, the brake pressure gradient $PB_{ij}$ to be introduced is then determined from the system deviation $\Delta\lambda_{ij}$ in a known manner, using a PID (proportion, integration, derivative) process, and is set by a lower-order controller in the corresponding wheel brake cylinder 2, if a triggering criterion is fulfilled for the brake pressure control. The actual slip or the time derivative of the actual slip, for example, can be used as triggering criterion.

FIG. 3 shows the characteristic for the factor $F_{a_{fmx}}$ as a function of the acceleration value $a_{fmx}$. If the deceleration achieved is small such as, for example, in the case of driving on ice, the permissible slip is to be a minimum, but is nevertheless to permit deceleration of the vehicle. Consequently, for values of $a_{fmx} < -1$ m/s² the factor is set to 0.25. If large decelerations of the vehicle are reached, the permissible slip is also to correspond to the maximum permissible slip, so that a vehicle deceleration is reached which is as large as possible. The factor F therefore assumes a value −1 for deceleration from $a_{fmx} > -8$ m/s². Linear interpolation is performed between these two corner values.

FIG. 4 shows the variation in the characteristics for the factor $F_{vari_{ij}}$. The characteristics for the rear axle (i=r) and the front axle (i=f) are different. In order to achieve more driving stability, the aim is to permit only a low system deviation $vari_{ij}$ at the rear axle.

For the rear axle, the characteristic $F_{vari_{ij}}$ decreases linearly form the initial value 1.1 to the value 0.9 for system deviations $vari_{hj}$ between 0 and 2%. Consequently, $F_{vari_{ij}}$ is fixed at the lower limiting value 0.9. The range of values for $F_{vari_{ij}}$ is tuned in this case to the controller. controller. The values specified here are therefore only an exemplary specification. In this case of a system deviation $vari_{vj} < 2\%$, a value $F_{vari_{ij}}$ of 1.1 is permissible for the front axle, and so the desired slip increases. Starting from a system deviation $vari_{vj} > 4\%$, the factor $F_{vari_{ij}}$ is limited to the value 0.9. It is determined therebetween by linear interpolation.

Figure 5A:
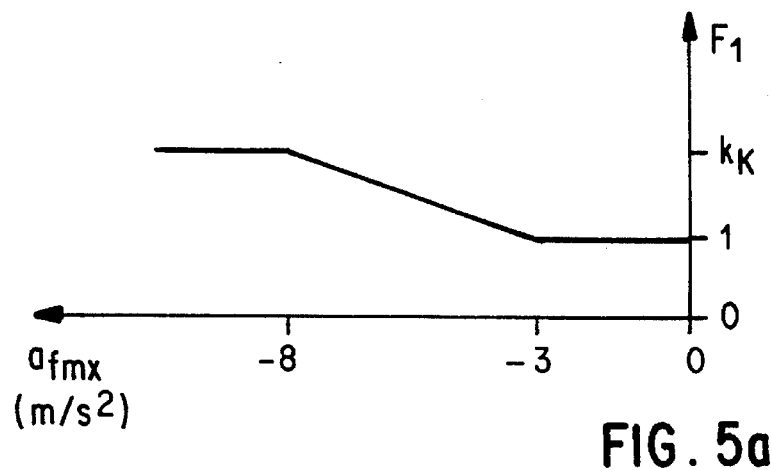

FIG. 5 shows the characteristics, those of the determination of the cornering-dependent factor $F_\kappa$. FIG. 5a shows the characteristic for the auxiliary variable F1, which is determined as a function of the acceleration $a_{fmx}$. F1 assumes the value 2 below an acceleration $a_{fmx}$ of −8 m/s², the value 1 above one of −3 m/s², and therebetween the value is determined by linear interpolation.

Figure 5B:
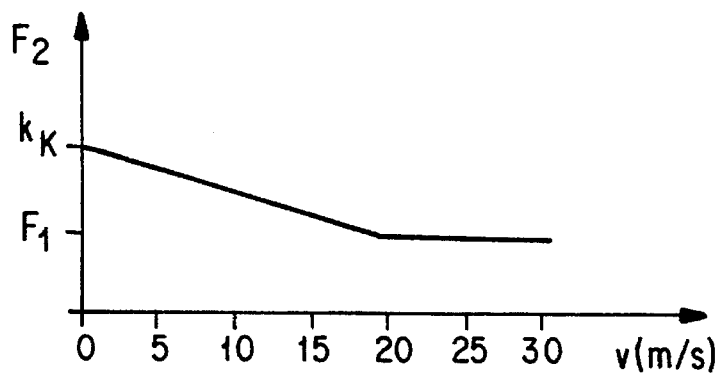

The range of values of the auxiliary variable F2 is represented in FIG. 5b and limited by F1 and the turning curvature factor $k_\kappa$. The value of $F_2$ falls linearly with rising vehicle speed v to reach $F_1$ at 20 m/s, and is then constant.

Figure 5C:
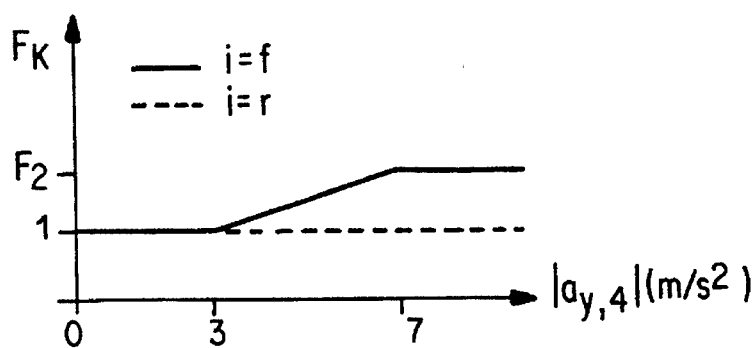

The value of the turn-corrected desired slip correction $F_\kappa$ is then represented with the factor $F_2$ as a parameter in FIG. 5c. The value of $F_\kappa$ is determined as a function of the lateral acceleration $a_{y,4}$ determined from the turning curvature. If the absolute value of the lateral acceleration $a_{y,4}$ is smaller than 3 m/s², $F_\kappa$ is set to 1. As the absolute value of the lateral acceleration rises further, the value $F_\kappa$ rises linearly until it reaches the value $F_2$ at 7 m/s², and is constant thereafter.

The variation of the curves, in particular the ranges of values, are given as an example. They must, for example, be adapted to the controller and possibly also to the vehicle by road tests.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for controlling brake pressure in a vehicle as a function of a deviation of actual slip of wheels of said vehicle relative to a desired slip, said method comprising the steps of:

detecting wheel speeds of the vehicle wheels;

determining vehicle speed based on detected wheel speeds;

determining actual slip for each wheel of said vehicle based on the wheel speeds and the vehicle speed;

determining a desired slip value for each wheel of said vehicle based on the vehicle speed and the detected wheel speed; and generating a brake pressure gradient at brake cylinders at each of said wheels, which brake pressure gradient is a function of a difference between the actual slip and the desired slip for each of said wheels.

2. Method according to claim 1 further comprising:

determining a maximum possible desired slip for stable handling is determined; and limiting said desired slip value for each wheel of said vehicle to said maximum possible desired slip.

3. Method according to claim 1 wherein only detected wheel speeds of the vehicle wheels and variables derived therefrom are used to determine the desired slip.

4. Method according to claim 1 wherein a vehicle deceleration determined from the measured wheel speeds is used to determine the desired slip.

5. Method according to claim 1 wherein said step of determining the desired slip comprises a further step of determining a turning curvature of a path of said vehicle.

6. Method according to claim 5 wherein the Ackerman condition is used to determine the turning curvature.

7. Method according to claim 1 wherein said step of determining a desired slip comprises determining a desired wheel slip for each wheel based on the desired slip determined from system deviation of the actual slip and desired slip, in at least one preceding control cycle for each wheel.

8. Method according to claim 7 wherein the desired wheel slip is determined as a function of variance of the system deviation for a number of directly preceding control cycles.

9. Method according to claim 7 wherein the ratio between the desired wheel slip and the desired slip is limited to a prescribed interval, in particular, to values between 0.8 and 1.2.

10. Method according to claim 1 wherein brake pressure control is performed only if a braking process is occurring and if a triggering criterion is fulfilled.

11. Method according to claim 10 wherein said triggering criterion comprise limiting values for wheel slip.

12. Method according to claim 1 wherein brake pressure control is performed independently for each of the wheels.

13. Method according to claim 1 wherein variables of state, being lateral acceleration, longitudinal acceleration and turning curvature are determined.

14. Method according claim 13 wherein the determined variables of state are transmitted to other control devices.

* * * * *